United States Patent
Cai (12)

(10) Patent No.: US 6,202,541 B1
(45) Date of Patent: Mar. 20, 2001

(54) APPARATUS FOR MAKING PURIFIED WATER AND RELATED DRINKS

(75) Inventor: Edward Z. Cai, Corvallis, OR (US)

(73) Assignee: Houseware Technology Group, Corvallis, OR (US)

( * ) Notice: Subject to any disclaimer, the term of this patent is extended or adjusted under 35 U.S.C. 154(b) by 0 days.

(21) Appl. No.: 09/293,516

(22) Filed: Apr. 15, 1999

Related U.S. Application Data

(63) Continuation-in-part of application No. 09/062,481, filed on Apr. 17, 1998.

(51) Int. Cl.[7] .............................. A47J 31/00; B01D 24/00
(52) U.S. Cl. ........................ 99/286; 99/290; 99/323.3; 210/282; 210/482; 210/419; 222/146.5
(58) Field of Search .......................... 99/286, 290, 298, 99/323.3; 210/482, 419, 429, 282, 474; 222/146.2, 146.5, 631

(56) References Cited

U.S. PATENT DOCUMENTS

| | | | |
|---|---|---|---|
| 3,405,630 | * 10/1968 | Weber, III | 99/286 X |
| 5,562,824 | * 10/1996 | Magnusson | 210/266 |
| 5,724,883 | * 3/1998 | Usherovich | 99/290 |
| 5,800,707 | * 9/1998 | Mehnert et al. | 99/286 X |
| 5,813,317 | * 9/1998 | Chang | 99/285 |
| 5,855,160 | * 1/1999 | Shen | 99/299 X |
| 5,913,961 | * 6/1999 | Chmiel et al. | 99/286 |

* cited by examiner

Primary Examiner—Reginald L. Alexander

(57) ABSTRACT

An apparatus for making drinks such as filtered water, coffee, espresso or tea which comprise a cold water filter system for purifying water for either direct consumption or use in extracting flavor-containing materials like coffee and a hot water filter assembly located on the brew head for removing impurities originated from both water itself and the parts of the apparatus in contact with water. The cold water filter system comprises a removable water container having at its bottom a water passageway, a filter cartridge removably mounted in the water passageway, a containing chamber for receiving the filtered water, and a valve in the water passageway for closing the passageway when the container is removed from and opening the passageway when placed onto the containing chamber. The hot water filter assembly comprises a filter cartridge having a hot water inlet and an outlet, a water-tight seal formed between the brew head and cartridge inlet and encircled by an elastic sealing ring, and a fixture for removably receiving the cartridge and retaining the cartridge in position to maintain the water-tight seal during the operation of the apparatus.

26 Claims, 3 Drawing Sheets

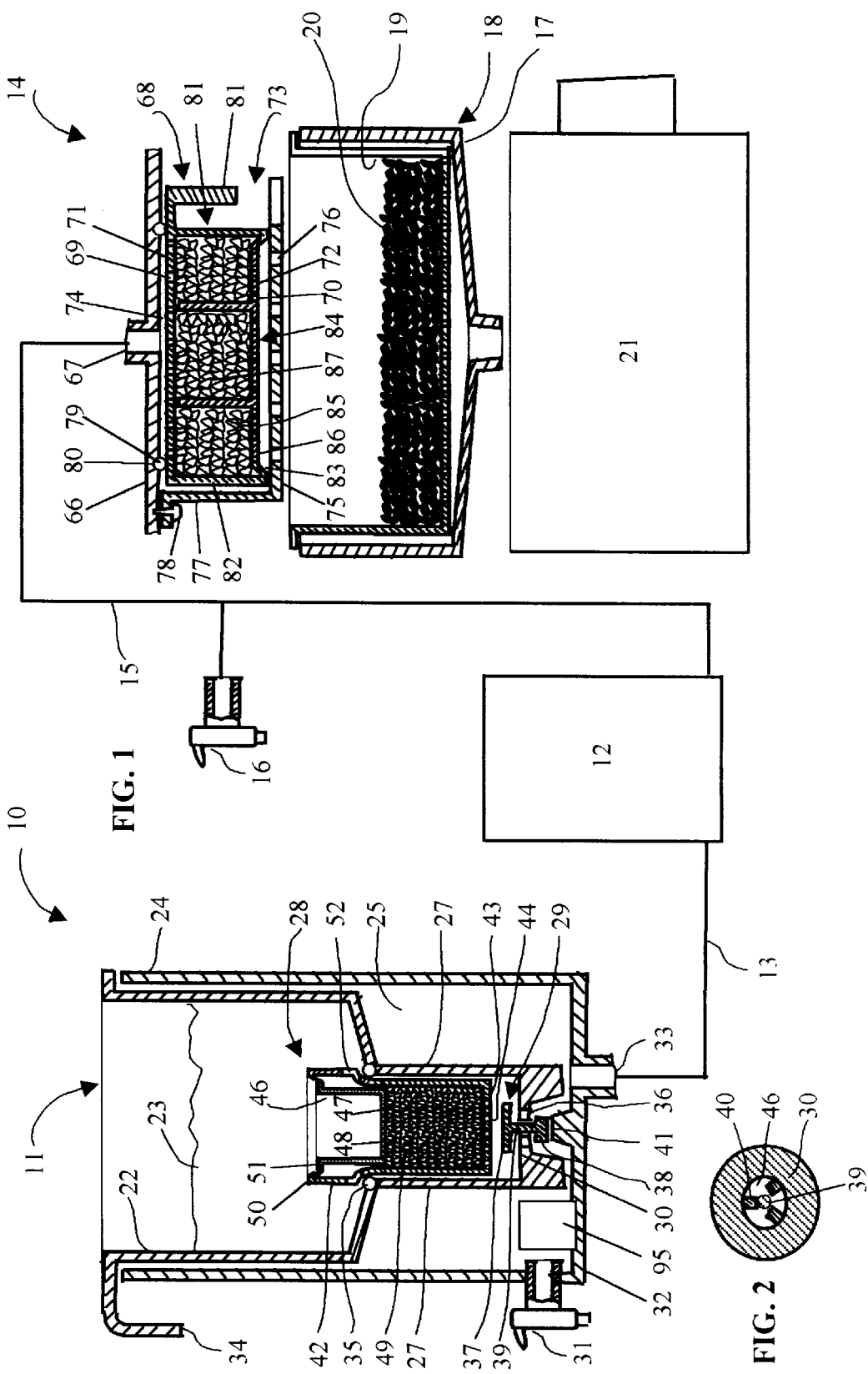

APPARATUS FOR MAKING PURIFIED WATER AND RELATED DRINKS

This is a continuation-in-part application of Ser. No. 09/062,481, filed Apr. 17, 1998.

DESCRIPTION OF PRIOR ART

Water is an increasingly popular drink, and is used to brew other drinks such as coffee, tea, cappuccino and espresso. Water filtration is known to improve water taste and the taste of drinks made from the filtered water. Water filtration pitchers have been increasingly used to filter water for either direct consumption or for use with automatic drip coffee makers in preparing coffee. Water filtration has also been integrated into automatic drip coffee makers where a cavity is formed between the bottom of water reservoir and the water heater tube for receiving a water filter cartridge. In this case, the filtered water enters the water heater as soon as it exits the cartridge. Such arrangement has several drawbacks. First, it can not provide a supply of filtered water as quickly as required by apparatus like espresso/cappuccino machines and those disclosed in U.S. Pat. No. 5,267,506. Second, it has low filtration efficiency because it can only use relatively large activated carbon particles to achieve the flow rate required by the automatic drip coffee makers. Third, none of the current coffee makers can produce cold filtered water for direct consumption. Forth, a partially clogged water filter cartridge will change the water flow rate through the water heaters of the automatic drip coffee makers, thus may cause changes in coffee temperature and taste. Fifth, the water filter cartridges provide a bed for bacteria growth and may produce foul odor. At last, the water filter cartridge in the reservoir can not remove the plastic odor and impurities resulting from contacting the plastic, rubber and metal parts of the apparatus. U.S. Pat. No. 5,393,548 discloses a device and method for filtering impurities from the water by positioning a water filtration device between the hot water drip outlet of an automatic drip coffee maker and the ground coffee in a filter. This device resolved to some degree the fourth and last drawbacks mentioned above with the existing water filter systems for automatic drip coffeemakers, but it caused additional problems, such as the overflow of unfiltered water from the top of the filter device, complexity in the device and coffee maker, and additional cleaning work required to remove the coffee grounds around the filter device.

Currently, none of the commercially available espresso and cappuccino machines have water filter system, although the consumers who drink espresso-based beverages like espresso, latte and cappuccino are normally more conscious to coffee quality and taste than the consumers who drink only regular coffee. There is currently no known water filtration system, which can be adapted to the existing espresso and cappuccino machines and the apparatus disclosed in U.S. Pat. No. 5,267,506 without major inventions. There is neither known water filtration system for producing purified water for producing steam for frothing milks for making milk-containing drinks like cappuccino and latte.

The present invention provides apparatus having novel and improved means for making filtered water for direct consumption, for use in preparing drinks such as espresso, coffee, tea, cappuccino and Latte and for producing steam for frothing milk, and is aimed at solving the problems associated with the existing apparatus for making such drinks.

SUMMARY OF THE INVENTION

In accordance with the present invention, there is provided a new apparatus and methods for making drinks such as filtered water, coffee, tea, cappuccino or espresso for human consumption and enjoyment. The apparatus comprises a cold water filter system for preparing purified water from a supply of water that may contain impurities for either direct consumption or use in making drinks, water heating and delivering means for heating the purified water and delivering the hot water and steam, a hot water filter assembly for filtering the impurities which are originated from the water itself or the plastic or rubber parts contacting water, a coffee filter for receiving a supply of flavor-containing material such as coffee and for allowing the extraction of the flavor-containing material by the hot water therein.

The cold water filter system comprises a first containing means for receiving a supply of water which may contain impurities, a second containing means for receiving the filtered water, a water flow passageway having one end connected to the bottom portion of the first containing means and the other end extended into the second containing means, a water filter cartridge removably mounted in the water flow passageway, an automatic valve located in the water flow passageway for automatically closing the passageway when the first containing means is removed from the second containing means and opening the water flow passageway when the first containing means is placed onto the second containing means, and discharging means such as a spigot and outlet located near the bottom of the second containing means for discharging the filtered water for either drinking directly or preparing other drinks. The water filter cartridge comprises a first cylindrical chamber having one end generally open and the other end made of a porous wall, a second cylindrical chamber having one end generally open and the other end made of a porous wall, snap locking means formed at the open end of the first cylindrical chamber and the porous wall end of the second cylindrical chamber, a space formed between the porous wall of the first and second cylindrical chambers after the second cylindrical chamber is snapped into the first cylindrical chamber, and a predetermined amount of filter materials like activated carbon confined in the space. In a modified embodiment of the cold water filter system, the first containing means is permanently attached to the second containing, means and the automatic valve is replaced with venting means connected to the second containing means. The venting means releases the air trapped in the second containing means during the water filtration and admits air into the second containing means during the discharging of the filtered water.

The hot water filter assembly is located at the outlet of the brew head so that the impurities originated from both water itself and from the parts of the apparatus in contact with water are removed right before the hot water reaches the flavor-containing material in the coffee filter. The hot water filter assembly comprises a water filter cartridge having a cartridge inlet for receiving the hot water from the outlet of the brew head and a cartridge outlet for discharging the filtered water into the coffee filter, a water distribution chamber formed between the outlet of the brew head and the cartridge inlet and encircled by an elastomer ring member to achieve a water-tight seal between the brew head and the cartridge inlet so that all the hot water from the brew head is directed into the water filter cartridge, and a fixture for removably receiving the water filter cartridge and for retaining the cartridge in position to maintain the water-tight seal between the brew head and the cartridge inlet during the operation of the apparatus. In one embodiment of the hot water filter assembly, the fixture is a compartment attached to the brew head and comprises a substantially round support base, a support sidewall of a predetermined height perpendicular to the support base, and an opening for receiving the cartridge into the compartment. In another embodiment of the hot water filter assembly, the fixture comprises a bolt formed on the brew head and dimensioned to insert into a hole formed in the filter cartridge and a nut for locking the filter cartridge in position after the filter cartridge is inserted into the bolt.

It is an object of the present invention to provide an automatic drip coffee maker for making both filtered water and coffee.

It is a further object of the present invention to provide an apparatus which has a water filter system for making filtered water either both direct human consumption and for use in preparing other drinks like espresso, cappuccino, coffee or tea.

It is a still fiber object of the present invention to provide an apparatus which has a cold water filter system that can quickly provide a certain amount of filtered water either for direct human consumption or for use to prepare other drinks like espresso, cappuccino, coffee or tea.

It is a still further object of the present invention to provide an apparatus for making drinks like espresso, cappuccino, coffee, tea or filtered water which can allow the user to remove its water reservoir having a water filter cartridge removably attached to the its water outlet without causing water leakage.

It is a still further object of the present invention to provide an apparatus which has a hot water filter assembly for removing the impurities originated from both water and the parts of the apparatus in contact with the water before the hot water is brought into contact with flavor-carrying materials like coffee or tea.

It is a still further object of the present invention to provide an apparatus for making drinks like espresso and cappuccino which allows easy mounting and removing of the water filter cartridge to and from a water filter assembly located on the brew head.

These and other objectives and advantages of the present invention will become apparent from the following description of the preferred embodiments, taken together with the accompanying drawings.

DESCRIPTION OF THE DRAWING

The accompanying drawing illustrates diagramaticaly non-limitative embodiment of the invention, as follows:

FIG. 1 is a schematic diagram showing the constitution of an apparatus for making drinks such as coffee, espresso, tea or filtered water in accordance with the present invention;

FIG. 2 is a sectional view for the outlet chamber of the cold water filter 11 shown in FIG. 1 taken along the line II—II;

DETAILED DESCRIPTION OF THE PREFERRED EMBODIMENTS

Figure 4:
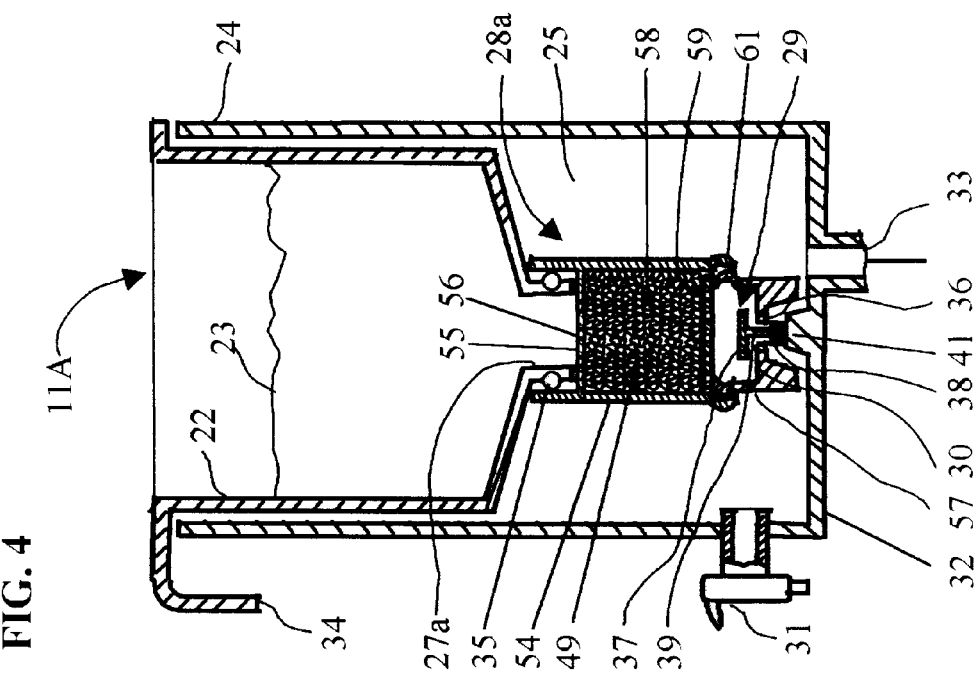
FIG. 4 is a sectional elevation view of another embodiment of the cold water filter 11 shown in FIG. 1.

FIG. 1 shows certain parts of an apparatus 10 for making drinks such as coffee, tea, espresso, latte, cappuccino, or filtered water that embodies one form of the present invention. Only those parts of the apparatus are shown which are necessary for full understanding of the invention. For example, the housing for the apparatus 10 and the parts for connecting the energy-consuming units of the apparatus to an energy source such as an electrical outlet have been omitted for the sake of clarity and simplicity. All such parts which are not specifically shown but necessary in order to render the apparatus fully operative can be similar, analogous or identical to the corresponding parts heretofore conventionally known and used in existing apparatus such as espresso machines, automatic drip coffeemakers and water filter devices.

Apparatus 10 comprises a cold water filter 11, a water heating and delivering system 12 connected to the cold water filter through conduit 13, a hot water filter 14 connected to the water heating and delivering system through a hot water conduit 15, a hot water faucet 16 attached to the hot water conduit 15, a flavor extraction system 18 having a coffee filter 19 for receiving a supply of flavor-carrying material 20 and a filter holder 17, and a receptacle 21 for receiving the brewed water from the filter holder. The water heating and delivering system 12 can be, but not limited to, the water heater and pump used in pump espresso machines, the water heating and steam pressure generation system in steam espresso machines, the water heating and delivering system used in automatic drip coffeemakers, and the water heating and delivering system disclosed in U.S. Pat. No. 5,267,506. The flavor extraction system 18 can be, but not limited to, the coffee filter assembly in espresso machines and automatic drip coffeemakers.

Cold water filter 11 comprises a first container 22 for receiving unfiltered water 23, a second container 24 on which the first container is removably mounted for receiving the filtered water 25, a water flow passageway chamber 27 having one end connected to the bottom portion of the first container 22 and another end extended into the second container 24, a water filter cartridge 28 removably mounted in the passageway chamber 27 for filtering the water in the first container, a valve 29 located at bottom 30 of the passageway chamber 27 for automatically shutting off the water flow through the passageway chamber 27 when the first container is removed from the second container and opening the water flow when the first container is mounted on the second container, a spigot 31 located near the bottom 32 of the second container for dispensing the filtered water to a container such as a cup for direct consumption, and an outlet 33 located at bottom 32 for introducing the filtered water to the water heating and delivery system 12. The first container 22 is dimensioned to loosely fit into the second container 24 so that there is a gap between the two containers venting the air in the second container during the filtering of the water 23 and discharging of the filtered water 25. The first container 22 has a handle 34 for easy handling of the container 22 and an o-ring 35 located at the upper end of the passageway chamber 27 for providing a water-tight seal between the chamber 27 and filter cartridge 28.

The valve 29 comprises an opening 36 formed on the bottom 30 of the passageway chamber 27, a sealing disc 37 for sealing the opening 36 when the first container 22 is removed from the second container 24, a retaining disc 38 for retaining the sealing disc in position, a connection stem 39 for connecting the sealing disc and retaining disc, prevention stems 40 (FIG. 2) formed on the inner peripheral of the opening 36 for preventing the retaining disc 38 from being pushed out of opening 36, and a protrusion 41 formed at the bottom 32 of the second container 24. The sealing disc 37, retaining disc 38 and connection stem 39 may be one integral part made of elastomer material. The lower end of the retaining disc 38 can be smaller than the upper end to facilitate the insertion of the retaining disc into the opening 36 during assembly. A spring (not shown) may be placed between the retaining disc 38 and the prevention stems 40 to improve the seal between the sealing disc 37 and the bottom 30 of the passageway chamber 27. The valve 29 automatically shuts off the water flow through the passageway chamber 27 when the first container 22 is removed from the second container 24, which causes the sealing disc 37 to cover the opening 36 due to the weight of the retaining disc 38, sealing disc 37 and connection stem 39, and automatically opens the water flow when the first container is mounted on the second container, which causes the sealing disc 37 to be pushed away from opening 36 by the protrusion 41.

The water filter cartridge 28 comprises a first cylindrical chamber 42 having a lower end 43 with numerous small openings 44 and a generally open upper end, a second cylindrical chamber 46 insertable into the first cylindrical chamber 42 having a lower end 47 with numerous small openings 48 and a generally open upper end, a space is formed between the lower end 43 of the first cylindrical chamber 42 and the lower end 47 of the second cylindrical chamber 46 to enclose filter materials 49 such as activated carbon contained. The openings 44 and 48 are small enough to prevent the filter materials 49 from leaking out. A tapered internal shoulder 50 is formed on the upper end of the first cylindrical chamber 42 and a tapered external shoulder 51 is formed on the upper end of the second cylindrical chamber 46. Shoulders 50 and 51 are so dimensioned that the second cylindrical chamber 46 can be snapped into the first chamber 42 to form a locking snap fit. The upper portion of the first cylindrical chamber 42 is slightly enlarged to ensure that the water filter cartridge 28 will not be pushed too much into the passageway chamber 27. Side water inlet 52 is formed on the peripheral walls of both the first and second cylindrical chambers to allow the water below the upper end of water filter cartridge 22 in the first container 22 to enter the cartridge. The first and second cylindrical chambers are so dimensioned that the second cylindrical chamber 46 fits tightly into the first cylindrical chamber 42 so that the filter materials 49 can not leak out from the space between the inner side wall of the second cylindrical chamber and the outer side wall of the first cylindrical chamber.

A first important advantage of the cold water filter 11 is that it enables the apparatus to produce both cold and hot filtered water either for direct consumption or for use in making other drinks such as coffee, espresso, cappuccino and/or tea. A second important advantage of the cold water filter is that it stores the filtered water 25 in the second container 24 that communicates with atmosphere through the gap between the first and second containers, which makes it possible to discharge a predetermined amount of filtered water at a rate quick enough for pump espresso machines and the apparatus disclosed in U.S. Pat. No. 5,267,506. A third important advantage of the cold water filter is that it allows the users to take only the first container 22 with the filter cartridge attached to a water faucet for refilling rather than to take the whole apparatus. It is appreciated that the cold water filter 11 can be constructed either as an independent apparatus for making filtered water or as an accessory attached to another apparatus which requires the use of water for making drinks such as espresso, coffee, cappuccino and latte. It is also appreciated that refrigeration means 95 can be included in the apparatus to make the temperature of the filtered water lower than that of the surrounding environments.

FIG. 4 shows a modified embodiment 11A of the cold water filter 11 of FIG. 1, wherein the valve 29 is part of the water filter cartridge 28a rather than part of the passageway chamber 27a of the first container 22. The water filter cartridge 28a is mounted to the modified passageway chamber 27a through the O-ring 35. In this modified embodiment 11A, water filter cartridge 28a comprises a first cylindrical containing chamber 54 having an upper end wall 55 with multiple openings 56, a generally closed side wall 57 and a lower end wall 58 having multiple openings 59, the filter materials 49 enclosed by the upper end wall 55, the side wall 57 and the lower end wall 58 of the first cylindrical containing chamber, a second cylindrical containing chamber 60 having a generally open upper end as the inlet for receiving the filtered water from the multiple openings 59 of the lower end wall of, a generally closed side wall 62 and the valve 29 located at the outlet for controlling the flow of the filtered water into and out of the containing chamber 60, and snap attachment details 61 formed at the lower end of the first cylindrical containing chamber 54 and the generally open upper end of the second cylindrical chamber 57 for attaching the two chambers in a snapping manner. The lower end wall 58 of first cylindrical containing chamber 54 is fixed in position by the generally open upper end of the second cylindrical containing chamber 60 and the filter materials 49 in the first cylindrical containing chamber 54.

It is appreciated that besides having all the advantages of the cold water filter 11 of FIG. 1, cold water filter 11A can avoid the dripping of water when replacing the filter cartridge. It is also appreciated that the water passageway chamber 27a of cold water filter 11A and the first cylindrical chamber 54 can be modified to allow the filter cartridge 28a to be mounted inside the water passageway chamber 27a as in the cold water filter 11 of FIG. 1.

Figure 6:
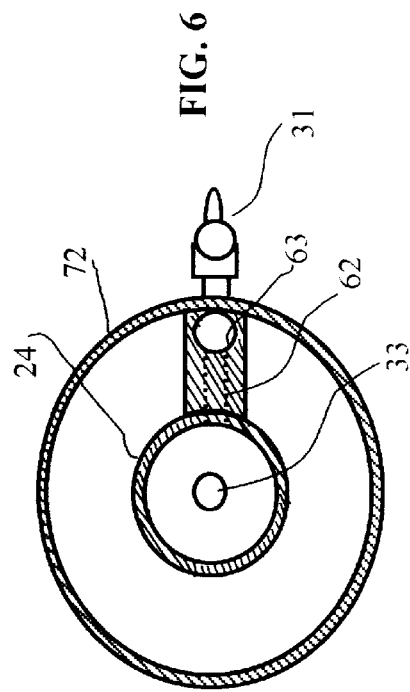
FIG. 6 is a sectional view along line VI—VI of FIG. 5.
Figure 5:
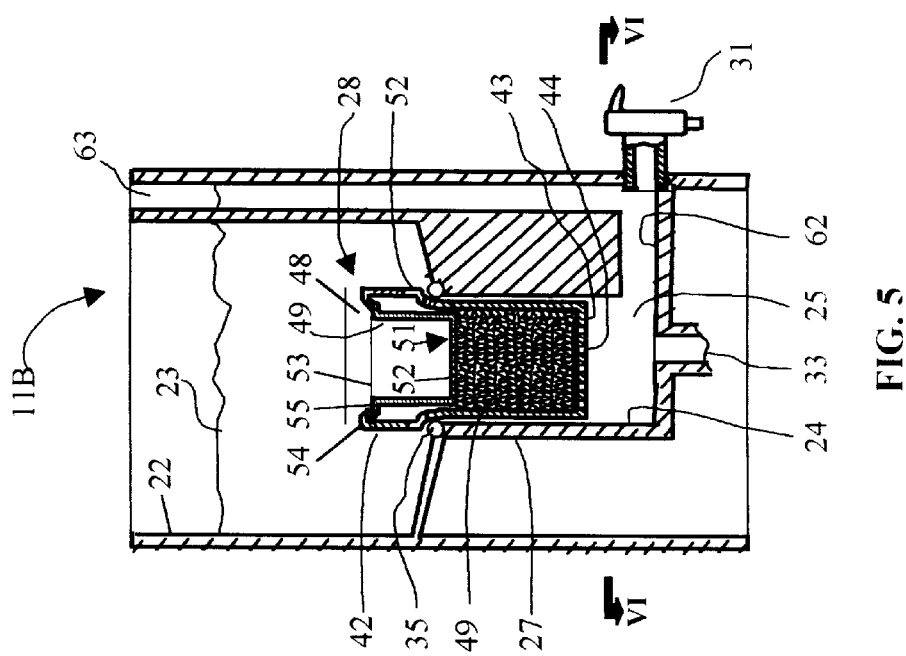
FIG. 5 is a sectional elevation view of another embodiment of the cold water filter 11 shown in FIG. 1.

Another modified embodiment 11B of the cold water filter 11 of FIG. 1 is specified, which, as illustrated in FIGS. 5 and 6, combines the first containing chamber 22 and the second containing chamber 24 by the water passageway chamber 27. The unfiltered water in the first containing chamber 22 passes through the water filter cartridge 22 in the passageway chamber 27 and the filtered water is stored in the relatively small second containing chamber 24. The filtered water 25 reaches the spigot 31 through channel 62 . The second containing chamber 24 communicates with atmosphere through vent conduit 63 for releasing the air in the second containing chamber to make space for the filtered water 25 and for admitting air into the second containing chamber to replace filtered water discharged through the spigot 31. The second containing chamber 24 is sufficiently large to hold at least one cup of filtered water 25.

It is appreciated that cold water filter 11B reduces the bacteria growth by maintaining the majority of the water unfiltered in the first containing chamber, which still contains the disinfecting agent like chlorine for inhibiting bacteria growth. This modified cold water system also has all the advantages of the cold water filters 11 except that the first containing chamber 22 can not be removed from the second containing chamber 24. It is appreciated that cold water filter 11B can be constructed either as an independent apparatus for making filtered water or as an accessory connected to another apparatus which uses filtered water to make drinks.

Figure 3:
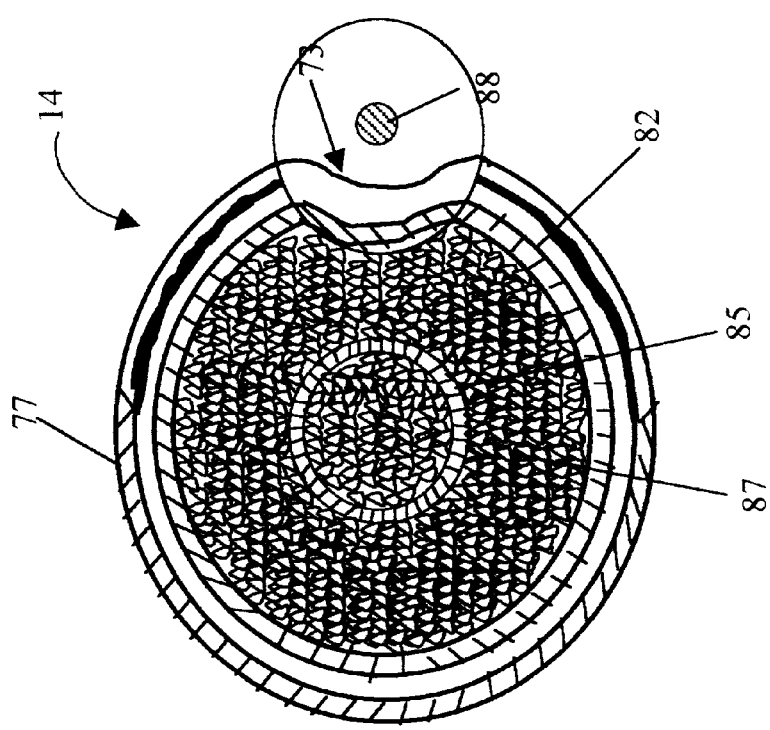
FIG. 3 is a sectional view of the hot water filter shown in FIG. 1, taken along the line III—III.

Refer now to the hot water filter 14 as illustrated in FIGS. 1 and 3, the hot water filter comprises a brew head member 66, a hot water inlet 67 connected to hot water conduit 15, a hot water filter cartridge 68 having multiple hot water inlet holes 69 and filtered water outlet holes 70 formed on the generally flat upper and lower end walls 71 and 72 of the cartridge, respectively, a compartment 73 for receiving the hot water filter cartridge, and a water distribution chamber 74 enclosed by the a sealing O-ring 79 received in a circular slot 80 on brew head member 66 and the brew head member 66 and the generally flat surface 71 of the cartridge 68 . A watertight seal is formed between the 0-ring 79 and the upper surface 71 of the hot water filter cartridge 68 after it is inserted into the compartment 73. The compartment 73 comprising a substantially round support base 75 with multiple openings 76, a side support wall 77. The compartment 73 is attached to the brew head member 66 by attachment means 78.

The water filter cartridge comprises a first member 81 having a substantially cylindrical side wall 82, a tapered internal shoulder 83 formed at the generally open lower end of the first member and the generally flat upper end wall 71 on which the multiple hot water inlet holes 69 are formed, a second member 84 having a substantially cylindrical side wall 85, a tapered external shoulder 86, the generally flat lower end wall 72 on which the multiple filtered water outlet holes 70 are formed and a generally open upper end, and a predetermined amount of filter materials 87 such as activated carbon and ion-exchange resins confined between the generally flat upper and lower end walls 71 and 72. A handle 88 for the hot water filter cartridge 68 is located on the side wall 82 of the first member 81 for assisting in mounting and removing the hot water filter cartridge into and out of the compartment 73.

The multiple hot water inlet holes 69 on the generally flat upper end wall 71 are small enough to prevent the filter materials 87 from leaking out of the cartridge 68. These outlet holes 69 are all located a certain distance away from the side wall 82 so that no holes are present outside the sealing O-ring 135 after the filter cartridge 68 is inserted into the compartment 73. The filtered water outlet holes 70 on the lower end wall 72 of the second member 84 are also small enough to prevent the filter materials 87 from leaking out of the hot water filter cartridge 68.

The tapered internal shoulder 83 of the first member 81 and the tapered external shoulder 86 of the second member 84 are so constructed that the second member 84 can be snapped into the first member 81. The cylindrical side wall 85 of the second member 84 is located a certain distance away from the tapered external shoulder 86 and is sufficiently tall so that it can cause certain tension between the internal shoulder 83 and the external shoulder 86 after the cartridge 68 is assembled. The tension between the internal and external shoulders provides a watertight seal between the first member 81 and second member 84.

It is appreciated that the hot water filter assembly can be slightly modified by removing the circular slot 80 and the sealing O-ring 79 from the brew head member 66 and placing them near the edge of the upper end wall 71 of the first member 81 (not shown). It is also appreciated that the compartment 73 can be formed as an integral part of the brew head member 66 (not shown).

Figure 7:
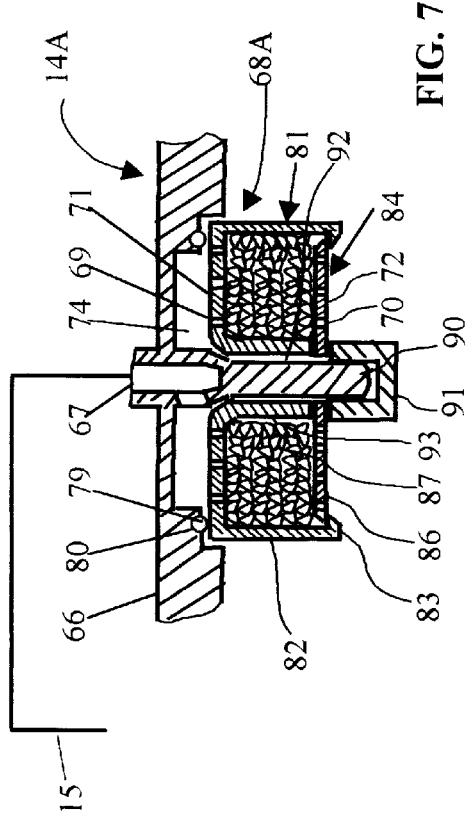
FIG. 7 is a sectional elevation view of another embodiment of the hot water filter 14 shown in FIG. 1.

A modified embodiment 14A of the hot water filter 14 of FIG. 1 is shown in FIG. 7. Unlike the filter 14 which uses the compartment 73 to receive and retain the hot water filter cartridge 68 in place, the hot water filter 14A uses a bolt 90 formed on the brew head member 66 and a nut 91 to receive and retain the hot water filter cartridge 68A in place. The cartridge 68A has a cylindrical central hole 92, which is formed by the center cylindrical wall 93 attached to the generally flat upper end wall 71 of the first member 81 and by the central hole formed on the generally flat second member 72, for receiving the bolt 90. To mount the cartridge 68A onto the brew head member 66, one simply pushes the cartridge upwards so that bolt 90 is received in the central hole 92 and then tightens the nut 91 into bolt 90.

The scope of the invention is obviously not restricted to the embodiments described by way of examples and depicted in the drawings, there being numerous changes, modifications, additions, and applications thereof imaginable within the purview of the claims.

What is claimed is:

1. An apparatus for making drinks such as filtered water, coffee, espresso or tea comprising:

a portable container for receiving a supply of water, said portable container having near its bottom a water passageway through which said water can leave said portable container, filtration means in said water passageway of said portable container for filtering the water in said portable container as said water passes through said filtration means in said water passageway;

containing means for receiving the filtered water from said filtration means, said containing means being structured to engage with said portable container, valve means positioned in said water passageway of said portable container, said valve means being operative between a first position, in which said valve means closes said water passageway thereby preventing water from flowing out of said portable container, and a second position, in which said valve means opens said water passageway thereby allowing the water in said portable container to flow through said filtration means and into said containing means, said valve means being triggered into said first position when said portable container is removed from said containing means and into said second position when said portable container is engaged with said containing means; and heating and delivering means for heating and delivering said filtered water to a supply of flavor-carrying materials like coffee or tea to extract the flavor out of said flavor-containing materials, thereby producing drinks such as coffee, espresso or tea.

2. An apparatus as defined in claim 1 wherein said apparatus further comprises air venting means for allowing air to leave or enter said containing means, thereby allowing the filtered water to enter or leave said containing means quickly.

3. An apparatus as defined in claim 1 wherein said filtration means comprises a chamber containing a supply of filtration material or materials.

4. An apparatus as defined in claim 1 wherein said filtration means comprises a chamber containing a supply of filtration material or materials and said valve means.

5. An apparatus as defined in claim 1 wherein said valve means comprises an opening in said water passageway, a valve member to close said opening, and a trigger member for moving said valve member between said first and second positions.

6. An apparatus for making drinks such as filtered water, coffee, espresso or tea comprising:

a portable container for receiving a supply of water, said portable container having near its bottom a water passagway through which said water can leave said portable container;

filtration means in said water passageway of said portable container for filtering the water in said portable container as said water passes through said filtration means in said water passageway;

containing means for receiving the filtered water from said filtration means, said containing means being structured to engage with said portable container;

valve means positioned in said water passageway of said portable container, said valve means being operative between a first position, in which said valve means closes said water passageway thereby preventing water from flowing out of said portable container, and a second position, in which said valve means opens said water passageway thereby allowing the water in said portable container to flow through said filtration means and into said containing means, said valve means being triggered into said first position when said portable container is removed from said containing means and into said second position when said portable container is engaged with said containing means, heating means for heating the filtered water in or from said containing means; hot water dispensing means such as a spigot located downstream of said heating means for dispensing the hot filtered water; and air venting means for communicating said containing means with atmosphere thereby allowing the filtered water to enter or leave said containing means quickly.

7. An apparatus as defined in claim 6 wherein said filtration means comprises a chamber containing a supply of filtration material or materials.

8. An apparatus as defined in claim 6 wherein said apparatus further comprises a water dispenser located near the bottom of said containing means for dispensing said filtered water.

9. An apparatus for making drinks such as filtered water, coffee, espresso or tea comprising:

a first containing means for receiving a supply of water, said first containing means having near its bottom a water passageway through which said water can leave said first containing means;

filtration means in said water passageway of said first containing means for filtering the water in said first containing means as said water passes through said filtration means in said water passageway;

a second containing means for receiving the filtered water from said filtration means;

a container for receiving a supply of flavor-carrying materials such as coffee or tea;

heating and delivering means for heating and delivering the filtered water in or from said second containing means to said supply of flavor-carrying materials such as coffee or tea in said container, in which the hot filtered water extracts the flavor out of said flavor-carrying materials thereby producing drinks such as coffee, espresso or tea; and dispensing means such as a spigot located near the bottom of said second containing means for dispensing the filtered water in said second containing means into a vessel such as a cup for drinking directly or other direct consumption.

10. An apparatus as defined in claim 9 further comprising air venting means for communicating said second containing means with atmosphere, thereby allowing the filtered water to leave or enter said second containing means quickly.

11. An apparatus as defined in claim 10 wherein said air venting means comprises a channel with a first end in communication with said second containing means and a second end in communication with atmosphere, said second end of said channel being positioned high enough so that the filtered water in said second containing means can not overflow out of said second end of said channel.

12. An apparatus as defined in claim 10 wherein said second containing means is large enough to store approximately one or more cups of filtered water so that one cup of filtered water can be quickly dispensed.

13. An apparatus as defined in claim 9 further comprising hot water dispensing means such as a spigot for dispensing the hot filtered water generated by said heating and delivery means.

14. An apparatus as defined in claim 9 further comprising valve means positioned in said water passageway of said first containing means to control the water flow through said water passageway, said valve means having a handle to allow the operator of said apparatus to set said valve means between a first position, in which said valve means closes said water passageway thereby preventing water from flowing out of said first containing means, and a second position, in which said valve means opens said water passageway thereby allowing the water in said first containing means to flow through said filtration means and into said second containing means.

15. An apparatus as defined in claim 9 wherein said filtration means comprises a chamber containing a supply of filtration material or materials.

16. An apparatus as defined in claim 9 further comprising valve means positioned in said water passageway of said first containing means, said valve means having trigger means located on said second containing means to automatically trigger said valve means into a first position, in which said valve means closes said water passageway thereby preventing water from flowing out of said first containing means, when said first containing means is removed from said second containing means, and into a second position, in which said valve means opens said water passageway thereby allowing the water in said first containing means to flow through said filtration means and into said second containing means, when said first containing means is engaged with said second containing means.

17. An apparatus as defined in claim 9 further comprising refrigeration means for cooling the filtered water in said second containing means.

18. An apparatus as defined in claim 16 wherein said filtration means comprises a chamber containing a supply of filtration material or materials and said valve means.

19. A apparatus for making drinks such as filtered water, coffee, espresso or tea comprising:

containing means for receiving a supply of water that may contain impurities;

heating and delivering means for transforming the water from said containing means into pressurized hot water, a head fixture having an inlet for receiving said pressurized hot water, a water filter cartridge having an inlet for receiving said pressurized hot water from said inlet of said head fixture and an outlet for the filtered water, sealing means for forming a watertight seal between said head fixture and said inlet of said water filter cartridge so that all or nearly all of said pressurized hot water from said brew head will be forced through said water filter cartridge by the pressure generated by said heating and delivering means; and holding means for maintaining the watertight seal between said head fixture and said inlet of said water filter cartridge, said holding means comprising a elongated member having a first end joined to said head fixture and a second end adapted to insert into an opening formed in said water filter cartridge and tightening means for securing said water filter cartridge to said elongated member.

20. An apparatus as defined in claim 19 wherein said tightening means comprises a threaded cap.

21. An apparatus as defined in claim 19 therein said tightening means comprises threads formed on said elongated member and said opening of said water filter cartridge.

22. An apparatus for making drinks such as filtered water, coffee, espresso, or tea comprising:

a container for receiving a supply of water, a heating and delivery system for delivering water in said container;

a head fixture having an inlet connected to said heating and delivery system to receive water from said container;

a water filter cartridge of a predetermined height, said cartridge having an inlet for receiving water from said inlet of said head fixture and an outlet for the filtered water;

a support base connected to said head fixture by a connector of a predetermined height; and an entrance formed between said support base and said head fixture for allowing a user or consumer to readily insert said water filter cartridge into the space between said support base and said head fixture or remove said water filter cartridge out of said space, said space being dimensioned to form sufficient seal between said head fixture and said water filter cartridge thereby allowing water from said inlet of said head fixture to enter and pass through said water filter cartridge.

23. An apparatus as defined in claim 22 wherein said connector comprises a side wall and said entrance comprises an opening or gate formed on said side wall sufficiently large to allow said water filter cartridge to pass through.

24. An apparatus as defined in claim 22 further comprising a basket removably attached to said head fixture for receiving the filtered water from said water filter cartridge.

25. An apparatus as defined in claim 22 wherein said water filter cartridge further comprises a handle to facilitate the removal or insertion of said water filter cartridge from or into said space through said entrance.

26. An apparatus for making drinks such as filtered water. coffee. espresso, or tea comprising:

a container for receiving a supply of water;

a heating and delivery system for delivering water in said container;

a head fixture having an inlet connected to said heating and delivery system to receive water from said container;

an elongated member of a predetermined height having a first end attached to said head fixture and a second extended away from said head fixture;

a water filter cartridge adapted to be removably receivable by said elongated member to allow a user or consumer to readily remove or mount said water filter cartridge from or to said elongated member, said water filter cartridge having an inlet for receiving water from said inlet of said head fixture, an outlet for the filtered water said elongated member and said water filter cartridge being dimensioned to form sufficient seal between said head fixture and said water filter cartridge when said water filter cartridge is mounted to said elongated member thereby allowing water from said inlet of said head fixture to enter said inlet of said water filter cartridge and subsequently pass through said water filter cartridge, said water filter cartridge further having an opening adapted to removably receive said elongated member for allowing the user or consumer to readily remove said water filter cartridge from said elongated member or mount said water filter cartridge to said elongated member.

* * * * *